United States Patent [19]

Forsyth et al.

[11] Patent Number: 4,813,466
[45] Date of Patent: Mar. 21, 1989

[54] SUPPORT TRACK FOR A WHEELED VEHICLE

[75] Inventors: Robert W. Forsyth; John P. Forsyth, both of Upland, Calif.

[73] Assignee: Vehicle Systems Development Corporation, Upland, Calif.

[21] Appl. No.: 942,786

[22] Filed: Dec. 17, 1986

[51] Int. Cl.[4] ............... B60C 27/20; B60C 11/00; B62D 55/21

[52] U.S. Cl. ................... 152/179; 152/185.1; 152/188; 152/191; 152/210; 152/220; 152/228; 180/9.0; 180/9.28; 244/100 C; 305/19; 305/58 R; 305/58 PC; 403/155; 403/379

[58] Field of Search ............ 152/178, 179, 182, 185.1, 152/187, 191, 225 R, 210, 225 C, 214, 226–230, 188, 220; 305/19, 7, 15, 39, 58 R, 58 PC, 60; 180/9.0, 9.28; 403/155, 379; 24/155 C, 155 CC; 244/100 R, 100 C

[56] References Cited

U.S. PATENT DOCUMENTS

| | | | |
|---|---|---|---|
| 1,077,129 | 10/1913 | Douglas | 152/191 X |
| 1,373,985 | 4/1921 | Soldani | 152/182 |
| 1,808,416 | 6/1931 | Kennedy | 152/225 R X |
| 2,008,210 | 7/1935 | Hipkins | 305/19 X |
| 2,706,663 | 4/1955 | Heckerman, Jr. | 152/228 X |
| 2,764,204 | 9/1956 | Armington | 152/182 |
| 2,764,206 | 9/1956 | Armington | 152/182 |
| 4,024,900 | 5/1977 | Thomas | 152/225 R X |
| 4,408,646 | 10/1983 | Forsyth | 152/179 |
| 4,699,553 | 10/1987 | Lesikar | 403/155 |

*Primary Examiner*—David Simmons
*Assistant Examiner*—Thomas Bokan

*Attorney, Agent, or Firm*—Sixbey, Friedman, Leedom & Ferguson

[57] ABSTRACT

An improved support track assembly for both protecting and improving the flotation and mobility of the resilient wheels of a vehicle is disclosed herein that comprises both a manually operable retention assembly for fastening the track into an endless belt around the vehicle wheel, and a track storage reel that conveniently positions the track under the wheel and in alignment therewith prior to installation. The improved support track is formed from a plurality of track members that are pivotally interconnected by means of connector pins, and the retention assembly is formed from a retaining pin having a first end that is transversely insertable into a track member in a connector-pin capturing position, and a second pin formed from a resilient loop of spring steel. When the retaining pin is inserted into a pin-capturing position, the terminus of the loop is resiliently biased in a latching position. However, the retention pin may be manually removed by overcoming the biasing force exerted by the spring steel loop and withdrawing the retaining pin. The track storage reel of the invention preferably includes a reel that is rotatably mounted in alignment with the wheel of the vehicle so that when the track is unwound from the wheel and the wheel is driven, the wheel will drive directly over the track in proper alignment. The track may be easily installed around the tires of military aircraft or artillery pieces or trucks, and allows such vehicles to be driven over unimproved or soft terrain without tire damage or sinkage.

10 Claims, 3 Drawing Sheets

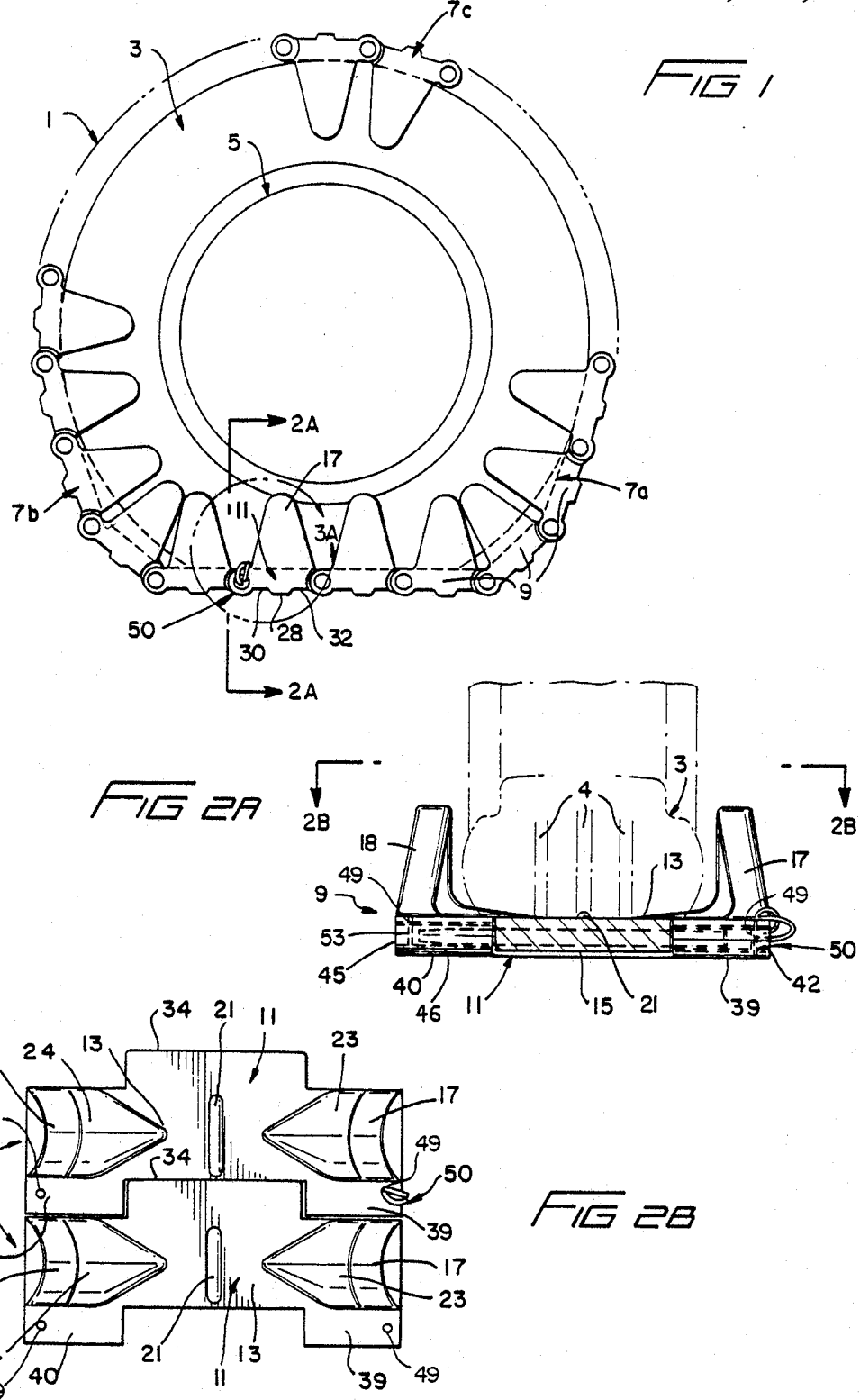

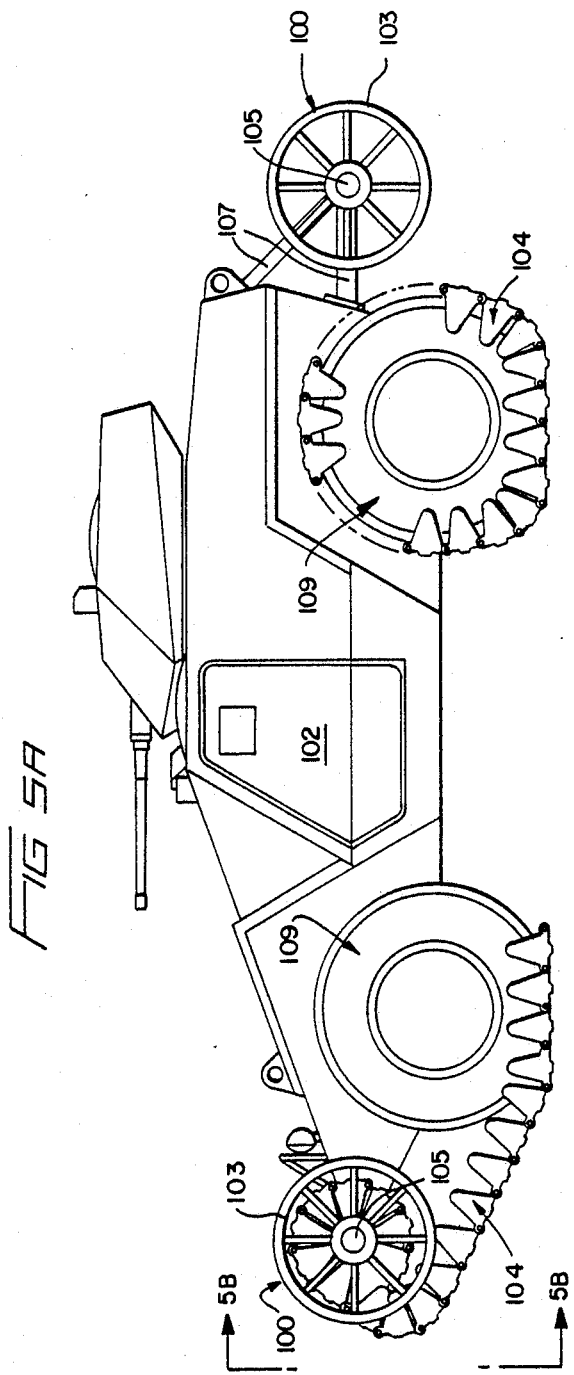

SUPPORT TRACK FOR A WHEELED VEHICLE

BACKGROUND OF THE INVENTION

1. Field of the Invention

This invention generally relates to an improved track assembly that is installable around a standard, resilient tire, or over two tires in common mounted on dual or tandem wheels, in order to provide the tire greater flotation and mobility over soft and unimproved terrain. It is specifically concerned with an improved mechanism that facilitates the installation and removal of such tracks around such tires.

While numerous devices for improving the performance of vehicles having standard, resilient tires over soft or unimproved terrain are known in the prior art, the capabilities of such devices are quite limited. A particularly successful example of such a device is disclosed in U.S. Pat. No. 4,408,646 entitled "Wheeled Vehicle Support Apparatus" invented by Robert W. Forsyth, one of the co-inventors of the instant invention. Generally speaking, this particular support apparatus is an endless track of pivotally connected tread members that is installable around virtually any type of resilient tire whenever an improved performance over soft or unimproved terrain is desired. In contrast to prior art tracks, the support track disclosed in U.S. Pat. No. 4,408,646 utilizes tread members having a special geometry that significantly increases the surface contact area between the ground and the wheels of the vehicle bearing the tracks. This particular track exploits a lever action between centrally located or laterally disposed guide horns on the tread members that results in increased lengthwise contact between the wheels of the vehicle and the ground, which in turn maximizes flotation and reduces ground pressure, while minimizing sinkage and "bulldozing" resistance when the wheels and track are in motion.

Unfortunately, while the track disclosed in U.S. Pat. No. 4,408,646 substantially increases the ability of a conventional high-pressure tire on an aircraft, or on an armored personnel carrier, or on an artillery piece to negotiate soft soil or unimproved terrain, the particular design disclosed in the patent is not without limitations.

For example, it is difficult, if not impossible to install the track disclosed in this patent without the use of at least some standard hand tools. The necessity for the use of such hand tools creates delays in the installation of the track that can be problematical in circumstances where very rapid installation deployment of such tracks is necessary, such as when an attack on an airfield is imminent. Under such conditions, a rapid installation of a protective flotation track over the vulnerable, high-pressure tires of an aircraft would allow the aircraft to be very quickly towed off of the airfield and over the soft, unimproved ground that frequently surrounds such airfields, where it may be protectively camouflaged. Still another example of where such rapid installation is highly desirable would be where combat conditions necessitated the rapid movement of an artillery piece, supply truck or armored personnel carrier driven on conventional tires from a road to a marsh or snowfield. Under such circumstances, a delay of a few minutes in the installation of the tracks could have disastrous consequences.

A related limitation associated with the track disclosed in U.S. Pat. No. 4,408,646 is the fact that hand tools are also required to remove this track. Since the ground speed of the aircraft, armored personnel carrier or artillery piece is lessened by such tracks, it is highly desirable that they be quickly removed when the aircraft or other vehicle is returned to improved ground. Consequently, the delays associated with the removal of such tracks can create problems almost as serious as those discussed with respect to a delayed installation.

Still another limitation associated with prior art tracks is that their specific geometry renders it difficult to quickly render such tracks in a pattern that is both compact and mechanically stable. This limitation can pose a significant disadvantage in military applications, where storage space is a highly valuable commodity and mechanical stability is necessary to avoid movement and weight shifting, the latter being especially critical during air transport.

Clearly, there is a need for a protective flotation track that offers the flotation and mobility and protective advantages of prior art tracks but which is quickly and easily installable onto or removable from a particular tire. Ideally, such a track should be conveniently storable in a mechanically stable configuration when not in use so as to avoid movement and weight shifting during transport.

SUMMARY OF THE INVENTION

Generally speaking, the invention is an improved support track assembly for the wheels of a vehicle that is easily installed and removed from around a wheel. The improved assembly comprises a track formed from a plurality of tread members pivotally interconnected by connector pins, wherein each member has pin-receiving openings on either end. The invention further comprises an installation and removal means that includes both a manually operable retention assembly for fastening the track into an endless belt around the vehicle wheel, and a track storage reel that conveniently positions the track under the vehicle wheel prior to installation.

The manually operable retention assembly allows at least one of the connector pins that pivotally interconnects the tread members hat form the track to be manually removed from or inserted into one of the pin-receiving openings of the track. The retention assembly includes a retaining pin having a first end that is insertable into a bore extending transverse to the pin-receiving opening, and a second end having a latching means for latching the first end of the retaining pin into the transverse bore in order to capture the connector pin within the pin-receiving opening. The latching means is preferably formed from a loop of resilient material that is integrally connected to the first end of the retaining pin on one end, and whose other end forms a latching member that is resiliently biased by the loop into a latching position within the pin-receiving opening. In operation, the retaining pin may be conveniently removed from the transverse bore by manually overcoming the biasing force of the resilient loop and withdrawing the pin.

In order to facilitate the removal of the connector pin of the track from the pin-receiving opening, a cable means preferably interconnects the retaining pin to the connector pin. This cable means may in turn be mounted onto the connector pin by means of an eyelet that also serves as a stop means that limits the extent to which the first end of the retaining pin may be inserted into the transverse bore including preventing the first end from beyond the transverse bore. The retention assembly may include a connecting collar that connects the other end of the cable means to the connector pin, enables the connector pin to rotate independently of the collar and cable means, and prevents dirt and other debris from entering the pin-receiving opening of the tread member. In the preferred embodiment of the invention, the pin-receiving openings extend completely through the connecting lugs present on either end of each tread member so that the connecting pins may be inserted through either side of the track assembly. Further, each tread member includes transverse bores at either end so that a retaining pin may be installed at both sides of the tread members. Such a configuration allows the connector pins to be installed and removed from either side of the tread members.

The track storage reel of the invention serves to both store the track when not in use, and to align a free end of the track with a wheel of the vehicle when installation is desired. In the preferred embodiment, the storage reel is rotatably mounted on an axle that is in turn placed in rotational alignment with the wheel of the vehicle. When the track is unwound from the reel assembly and the wheel of the vehicle is driven, the wheel will drive over the free end of the track. The track may then be wrapped around the wheel, and manually interconnected into an endless belt that circumscribes the wheel by means of the manually operable retention assembly.

To enhance the storability of the track, the improved track assembly of the invention may further be formed from tread members whose ground-engaging surfaces include a complementary configuration of laterally disposed bars and recesses that are mutually internestable into a compact and stable storage arrangement. Such a feature allows a set pair of tracks to be compactly stored and transported in a stable configuration within any suitable container, including n aerodynamically shaped pod for subsequent use in conjunction with the landing wheels of an aircraft at a remote base.

Finally, each of the tread members of the improved track assembly of the invention may include at least one protrusion projecting up from its wheel-engaging surface for maintaining the proper alignment between the resilient tire and the tread members during operation. In the preferred embodiment, such protrusions are complementary to the shape of the tread pattern of the resilient tires used in the vehicle so that these protrusions interfit with the tread pattern during the operation of the vehicle.

BRIEF DESCRIPTION OF THE SEVERAL FIGURES

FIG. 1 is a side view of the improved support track of the invention installed around a resilient tire;

FIG. 2A is a cross-sectional view of the track and tire illustrated in FIG. 1 along the line 2A—2A;

FIG. 2B is a plan view of the cross section of the track and tire illustrated in FIG. 2A over the line 2B—2B;

FIG. 4B is a cross-sectional view of the pod and tracks illustrated in FIG. 4A along the line 4B—4B;

FIG. 5A is a side view of the track storage reels of the invention mounted on an armored personnel carrier, and FIG. 5B is a front view of a track storage reel of the invention illustrated in FIG. 5A as seen from the line 5B—5B.

DETAILED DESCRIPTION OF THE PREFERRED EMBODIMENT

Figure 3A:
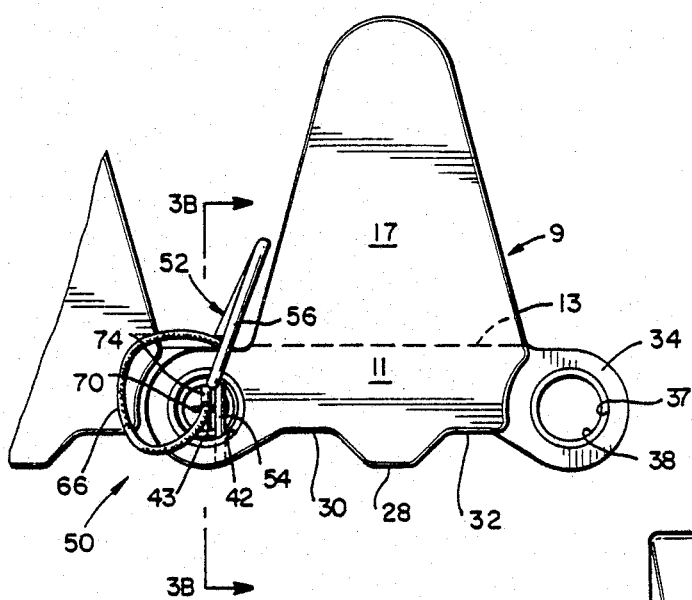
FIG. 3A is an enlargement of the area in FIG. surrounded by the dotted circle, showing a side view of the track retention assembly of the invention.

With reference now to FIGS. 1, 2A and 2B, wherein like numerals designate like components throughout all of the several figures, the improved flotation track assembly 1 of the invention is particularly adapted for installation around conventional, resilient pneumatic tires 3, either singly or over two tires mounted on tandem wheels. Such tires 3 frequently bear a traction-improving tread pattern 4 around their outer edges and circumscribe a metallic vehicle wheel 5 around their inner edges. In instances where the flotation track assembly 1 is applied to single wheels (as opposed to the dual or in-tandem wheels that are utilized on some vehicles), the flotation track assembly 1 is formed from three tread segments 7A, 7B and 7C, each of which is detachably connectable to the other by means which will be specifically described shortly. Each of these tread segments 7A, 7B and 7C is in turn formed from seven tread members 9 that are pivotally interconnected to one another as shown. Each of the tread members 9 includes a tread block 11 having an interior surface 13 that engages the tread 4 of the tire 3, and an exterior surface 15 that engages the ground. Each of the tread blocks 11 further includes at least one guide horn member 17, 18 for both maintaining the improved track 1 around the tire 3 as the tire 3 rotates, as well as for continuously providing a relatively large and flat contact area between the flotation track 1 and the ground that is between three and five times greater than its contact area would be with the tire 3 only. This last functional feature results from the manner in which the rounded ends of the guide horns 17 and 18 interact when the tire 3 rotates, and is explained in detail in U.S. Pat. No. 4,408,646.

On their inner surfaces, each of the tread blocks 11 includes at least one tire tread guide 21 that is preferably disposed in the center of the interior surface 13 as shown. While these tire tread guides 21 are illustrated as being elongated projections that are aligned with the plane of rotation of the tire 3, they may assume any shape that is receivable within the particular tread pattern 4 of the tire 3. Hence, the guides 21 could be just as easily projections that are zig-zag shaped, or transversely disposed to the plane of rotation of the tire 3. Positioned on either side of the tire tread guide 21 are cone-shaped traction lobes 23 and 24. Together, the tire tread guides 21, and the cone-shaped traction lobes 23, 24 help prevent side-loading from occurring between the side wall of the tire 3 and the interior surfaces of the guide horn members 17 and 18 by maintaining the tread 4 of the tire 3 in a central position over each of the interior surfaces 13 of the tread blocks 11.

On their outer surfaces, each of the tread blocks 11 includes an integrally formed, laterally disposed rib 28. Disposed on either side of the rib 28 are recesses 30 and 32 that are complementary in shape to the rib 28. This particular profile of the exterior surfaces 15 of the tread blocks 11 serves two important functions. First, the ribs 28 improve the structural characteristics of the tread members, especially with respect to resisting the bending loads imposed by the tires. Secondly, the complementary shape of the recesses 30 and 32 on either side of the rib 28 render the ground-engaging surfaces 15 of separate tread segments 7A, 7B, and 7C interfittable with one another when their ground engaging faces are placed in contact with one another. This nestability advantageously allows a pair of the improved flotation tracks 1 to be stored in a compact and stable relationship.

Each of the tread blocks 11 further includes a centrally disposed male lug 34 on one end, and a pair of laterally disposed female lugs 39, 40 on its other end. Both the centrally disposed lug 34 and each of the laterally disposed female lugs 39, 40 includes a pin-receiving bore or opening 37, 42, and 45, respectively. Each of these bores 37, 42 and 45 extends completely through its respective lug. The interior of each of these bores is lined with a thin tubular bushing 38, 43, and 46. As is indicated in FIGS. 2A and 2B, the bores 37, 42 and 45 are mutually alignable when the centrally disposed lug 34 is inserted between the two female lugs 39 and 40. When the bores 37, 42 and 45 are so aligned, they form a single, elongated pin-receiving opening somewhat longer than the connector pins 48 that pivotally interconnect each of the tread members 9 to form the flotation track 1. It should be noted that each of the pin-receiving bores 42, 45 located in the female lugs 39, 40 includes a transversely disposed bore 49 near its outer extremity for a purpose which will be explained presently.

Figure 3B:
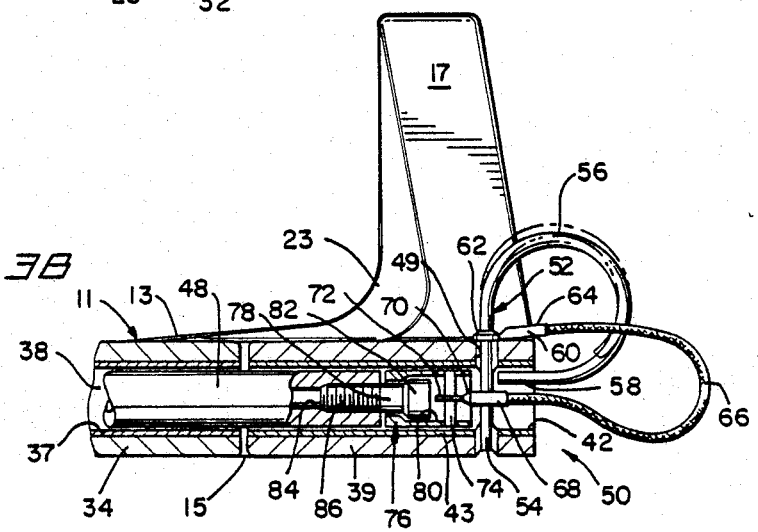
FIG. 3B is a cross-sectional view of the track retention assembly illustrated in FIG. 3A the line 3B—3B.

With reference now to FIGS. 3A, 3B, the improved flotation track assembly 1 includes at least one manually operable retention assembly 50 for detachably connecting the tread segments 7A, 7B and 7C into a continuous belt. In the preferred embodiment, the track assembly 1 includes three such retention assemblies (one between each of the tread segments 7A, 7B and 7C) although only one such retention assembly 50 is illustrated for the purposes of simplicity. The retention assembly 50 includes a manually operable retention pin 52 that is preferably formed from a single piece of spring steel. On one end, the retention pin 52 includes a retaining portion 54 that capture the connecting pin 48 within the pin-receiving opening formed by the bores 37, 42 and 45 when it is inserted through the transverse bore 49 in female lug 39 of the tread member 9 in the position illustrated in FIG. 3B. In the opposite female lug 40 of the tread member 9, a dowel pin 53 inserted in transverse bore 49 captures the other end of the connecting pin 48. Opposite its retaining portion 54, the retention pin 56 includes a latching portion 56 formed from a loop of spring steel. The loop of the latching portion 56 is configured so that the terminus 58 of the loop will extend into the pin-receiving bore 42 of the female lug 39 when the retaining portion 54 of the pin 52 is inserted through the transversely disposed bore 49. In operation, the terminus 58 of the loop forming the latching portion 56 may be conveniently unlatched from the bore 42 by inserting one's finger into the loop, and simultaneously applying both a lateral and vertical force so that the loop is pulled outwardly into the position indicated in phantom. In the preferred embodiment, the loop of the latching portion 56 has a large enough inner diameter to accommodate a gloved finger.

In addition to the retention pin 52, the retention assembly 50 includes an eyelet 60 having eyelet member 62 swaged onto the beginning portion of the latching portion 56. This eyelet member acts as a stop that limits the extent to which the retaining portion 54 of the pin 52 may be inserted through the transversely disposed bore 49. This eyelet 60 further includes fastening clip 64 that is connected to one end of a cable or lanyard 66 as shown. In the preferred embodiment, lanyard 66 is formed from a strong, flexible and corrosion resistant material, such as braided, stainless steel wire. The other end of this cable or lanyard 66 is connected to the fastening clip 68 of an eyelet 70 having an eyelet member 72 that is swaged onto a dowel pin 74. The dowel pin 74 is in turn connected to a collar member 76. The collar member 76 not only co-acts with a bolt 78 to form a mechanical connection between the connector pin 48 and the lanyard 66, but further serves as a plug that prevents dirt or other debris from becoming lodged in the pin-receiving bores 37, 42 and 45.

In the preferred embodiment, the collar member 76 includes a cylindrical recess 80 for receiving the head 82 of the previously mentioned bolt 78, while the outer end of the connecting pin 48 includes a bore 84 for receiving the threaded shank 86 of the bolt 78. In addition to making the mechanical connection between connecting pin 48 and lanyard 66 so lanyard 66 can be used to withdraw connecting pin 48, the foregoing arrangement enables both the connecting pin 48 and bolt 78 threaded into it to rotate freely under the influence of track assembly 1 operation, independent of collar member 76, so that the lanyard 66 attached to collar member 76 does not twist and become snarled and difficult to use.

In operation, when the operator desires to install the flotation track assembly 1 around a tire 3, the track assembly 1 is wrapped around the tire 3 in the position illustrated in FIG. 1. The male lug 34 present on one end of the track is inserted between the two female lugs 39 and 40 (on the other end of the track) so that the pin-receiving bores 37, 42 and 45 are in alignment. A connector pin 48 having a retention assembly 50 connected thereto is then manually inserted into the bushings 38, 43, 46 lining these bores until the outer edge of the collar member 76 is disposed on the inside of the transversely disposed bore 49. The pin-retaining portion 54 of the retention pin 52 is then inserted through the end of the transverse bore 49 located on the outer, inside surface of the tread block 11 until the eyelet member 62 prevents the pin-retaining portion 54 from being inserted any further. The operator then uses his fingers to overcome the biasing force within the loop forming the latching portion 56, and then inserts the terminus 58 of this loop into the latching position illustrated in FIG. 3B. In order to facilitate the manual insertion of the connector pin 48 through the bores 37, 42 and 45, the pin 48 is preferably coated with a conventional lubricant. When the operator desires to remove the track from the tire 3, he merely inserts his finger through the loop forming the latching portion 56, and pulls out the latching terminus 58 with a lateral motion until it assumes the position illustrated in phantom, and then withdraws the retaining pin 52 from the transversely disposed bore 49. He then pulls out the connector pin 48 by pulling on the lanyard 66 through the loop forming the latching portion 56. The provision of three such retention assemblies 50 in a single endless track assembly 1 ensures that at least one of the retention assemblies 50 will be conveniently accessible to the fingers of the operator. Additionally, the provision of transversely disposed bores 49 across each of the pin receiving bores 42 and 45 present in both the female lugs 39 and 40 allows the operator to install the retention assemblies on either side of the endless track assembly 1.

Figure 4A:
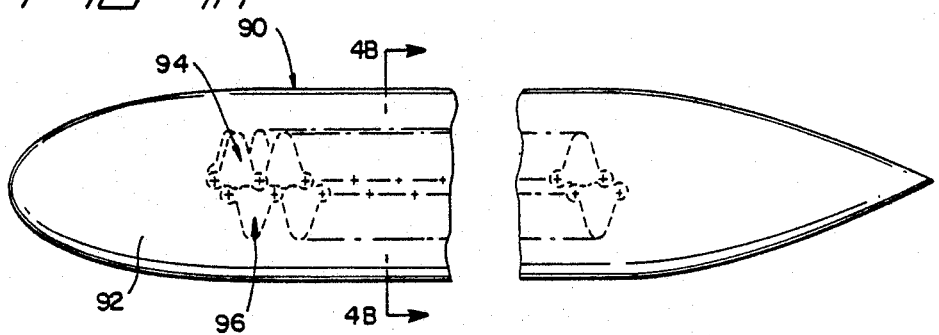
FIG. 4A is a side view of a set of the improved flotation tracks of the invention compactly and nestably arranged within an aerodynamically shaped pod.

FIGS. 4A and 4B illustrate the utility of the nestability feature of the track assembly 1. In this particular application, an aerodynamically shaped pod 90 having a removable nose 92 houses two or more separate flotation tracks 94 and 96 of the invention. The bottom surfaces of each of these tracks 94, 96 are not only nestable, but mutually interlockable by virtue of the integrally formed ribs 28 and complementary recesses 30 and 32 provided on the ground-engaging exterior surfaces 15 of each of the tread blocks 11. Such aerodynamically shaped pods 90 allow an aircraft with a limited amount of stowage space (such as a fighter plane) to carry a set of the flotation tracks of the invention in a mechanically stable and compact configuration that will not easily become disarrayed during storage as a result of extraneous vibration. If desired, such a pod may be provided with a tubular space 98 (as seen in FIG. 4B), that may optionally house a collapsible towbar for towing the aircraft onto unimproved or soft terrain once the track assemblies 94 and 96 of the invention have been installed around its wheels.

FIGS. 5A and 5B illustrate a further embodiment of the invention that renders the track 1 even more easily installable onto or removable from the tires of a ground vehicle, such as an armored personnel carrier. In this particular embodiment, storage reel assemblies 100 are provided in an armored personnel carrier 102 adjacent to each of the tires 109 of the vehicle. Each of these reel assemblies 100 includes a reel 103 capable of storing one flotation track assembly 104 thereon in a compactly coiled configuration. Each of the reels 103 is rotatably mounted on an axle member 105 that is either directly connected onto the body of the vehicle itself (as is the case in the front reel assemblies 100), or that is connected to the vehicle body by means of a mounting bracket 107). As may best be seen with respect to FIG. 5B, each of the reels 103 is preferably centrally aligned with the plane of rotation of its respective vehicle tire 109 so that when the track 104 is unwound therefrom and the tire 109 is driven, the tire 109 will naturally drive itself over the track assembly 104 in alignment therewith with the tire 109 centrally disposed between the laterally disposed guide horns on either side of the track 104. These reel assemblies 100, in combination with the previously described manually operable retention assemblies 50 provide an improved flotation track that may be deployed around a tire 109 on an extremely rapid basis on a ground vehicle.

Although the present invention has been described in this patent application with reference to a preferred embodiment, it should be understood that the invention is not limited to the details thereof. A number of possible substitutions and modifications may be inferred from the foregoing detailed description and others will appear to those of ordinary skill in the art. For example, the loop forming the latching portion 56 of the pin 52 may be replaced by a spring and detent member that detachably co-acts with the outer end of the pin-receiving opening 42. Additionally, the reel assemblies 100 may be disposed directly above their respective tires 109 and formed within the cabin of the armored personnel carrier 102 if desired. All such substitutions and modifications are intended to fall within the scope of this invention as defined in the appended claims.

We claim:

1. A support track assembly for the wheels of a vehicle having an improved means for installing and removing the track from a wheel, comprising:
   (a) a plurality of tread members, wherein each member includes pin-receiving openings on either end, and wherein a selected one of said tread members includes a bore transversely disposed across an end of one of its pin-receiving openings;
   (b) a plurality of connector pins that are slidably insertable into and removable from the pin-receiving openings in the tread members for pivotally interconnecting said tread members, and
   (c) a manually operable retention assembly for both removing and securing the connector pin associated with the pin-receiving opening of said selected tread member so that said track may be manually removed and installed with respect to a wheel, wherein said retention assembly includes a retaining pin having a first end that is insertable into said transverse bore, and a second end having a latching means receivable within the pin-receiving opening of said selected tread member for latching the first end of the retaining pin into the transverse bore so that both said connector pin and said retaining pin are captured within said pin-receiving opening.

2. The track of claim 1, wherein said retention assembly further includes a stop means for preventing the first end of the retaining pin from extending beyond said transverse bore, and said latching means includes a loop of resilient material that is connected to the first end of the retention pin on one end, and whose other end forms a latching member that is resiliently biased by said loop into a latching position within the pin-receiving opening, but which is manually removable from said pin-receiving opening by overcoming the biasing force of said loop.

3. The track of claim 2, further including a means for connecting the connector pin to the retaining pin so that the connector pin may be withdrawn from the pin-receiving opening by pulling on the retaining pin after the first end of the retaining pins is removed from said transverse bore.

4. The track of claim 3, wherein the connecting means includes a cable means, and the first end of the cable means is connected to the connector pin, and the second end is connected to an eyelet that is in turn connected to the retaining pin.

5. The track of claim 3, wherein the connecting means includes a means for rotatably connecting the cable means to the connector pin so that any rotational movement of the connector pin will not be transmitted to the cable means.

6. The track of claim 4, wherein the eyelet serves as said stop means that prevents the first end of the retaining pin from extending beyond the transverse bore across the pin-receiving opening in the selected tread member.

7. The track of claim 1, wherein each tread member includes a tread block having a wheel engaging surface and a ground engaging surface, and wherein said wheel engaging surface includes at least one wheel engaging projection for resisting lateral movement between a wheel and the ground engaging surface of the tread block.

8. The track of claim 7, wherein said wheel has a tread pattern on its exterior surface, and wherein said wheel engaging projection is receivable within the recesses of said tread pattern to facilitate the transfer of braking and turning forces from said wheel to said track.

9. The track of claim 1, wherein the ground-engaging surfaces of the tread blocks of the tread members include complementary patterns, so that separate tracks formed form said tread members may be interlockably and compactly stacked and stowed.

10. The support track assembly defined in claim 1, wherein said assembly is used in combination with a dual wheel.

* * * * *